United States Patent [19]

Kennedy et al.

[11] Patent Number: 4,604,938
[45] Date of Patent: Aug. 12, 1986

[54] ARRESTING AND RECOVERY SYSTEM FOR TEST MISSILES

[75] Inventors: Robert E. Kennedy, Santa Cruz; James D. Neef, Sunnyvale, both of Calif.

[73] Assignee: The United States of America as represented by the Secretary of the Navy, Washington, D.C.

[21] Appl. No.: 637,238

[22] Filed: Aug. 2, 1984

[51] Int. Cl.$^4$ .................. F41F 3/042; F41F 3/052; F16F 7/00
[52] U.S. Cl. .................................. 89/1.8; 244/110 A
[58] Field of Search .......................... 89/1.8; 73/167; 244/110 F, 110 A

[56] References Cited

U.S. PATENT DOCUMENTS

| | | | |
|---|---|---|---|
| 3,053,479 | 9/1962 | Siegel et al. | 89/1.8 X |
| 3,081,626 | 3/1963 | Shaller | 89/1.8 X |
| 3,258,227 | 6/1966 | Girolamo et al. | 244/110 F X |
| 3,309,044 | 3/1967 | Strance et al. | 244/110 F |
| 3,599,906 | 8/1971 | Reinemuth | 244/110 A |
| 3,731,898 | 5/1973 | Smith | 89/1.8 X |

Primary Examiner—David H. Brown
Attorney, Agent, or Firm—Robert F. Beers; Henry Hansen; Vincent T. Pace

[57] ABSTRACT

A system for arresting and recovering test ballistic missiles is adaptable for use in an existing facility and with the existing arresting engine. A long loop of cable encircles a sheave on the nose-end of the test missile and is supported by sheaves mounted on the support structure. The ends of the cable loop are terminated on one side of a singletree device. The other side is connected by a single cable to the arresting engine. One end of the cable loop slidably engages with the singletree and has an end cap. As the test missile is launched the cable loop and singletree are drawn toward a ratchet mechanism which grasps the end cap. An intermittent pulling machine is disposed for anchoring one leg of the cable loop whereby the test missile may be later raised or lowered for recovery. The system effectively doubles the load carrying capacity of an existing arresting engine by providing mechanical advantage.

9 Claims, 20 Drawing Figures

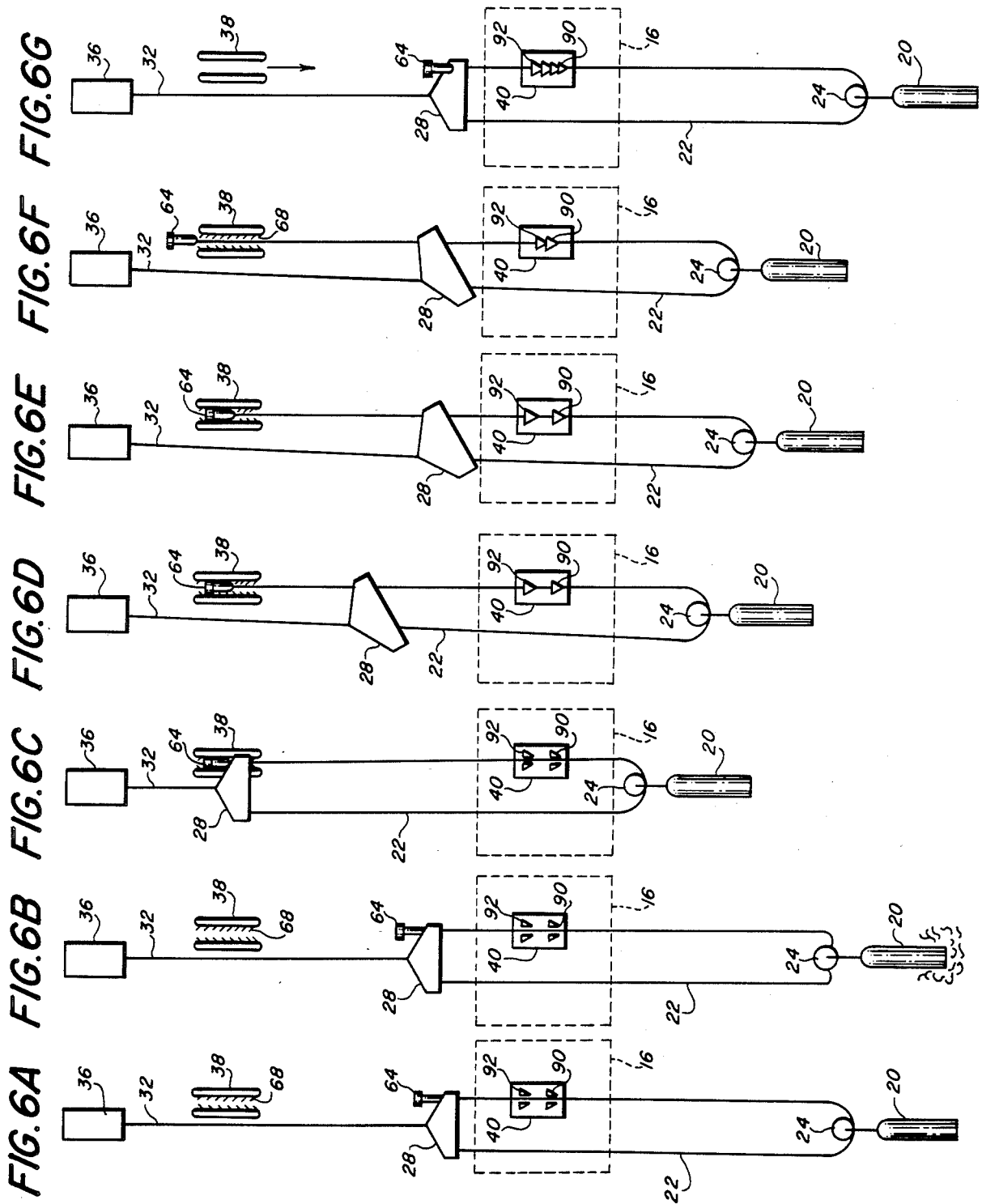

ARRESTING AND RECOVERY SYSTEM FOR TEST MISSILES

STATEMENT OF GOVERNMENT INTEREST

The inventions described herein may be manufactured and used by or for the Government of the United States of America for governmental purposes without the payment of any royalties thereon or therefor.

BACKGROUND OF THE INVENTION

This invention relates generally to systems for arresting test missiles launched from a test launcher, and more particularly to improved apparatus for arresting heavier test missiles by increasing the mechanical advantage of existing facilities.

The basis and need for arresting ballistic missiles during test launches has been well documented. See for example U.S. Pat. No. 3,081,626 to Shaller and U.S. Pat. No. 3,053,479 to Siegel et al. Many existing facilities for missile testing were built to handle vehicles of a certain weight. Newer ballistic missiles are much heavier than their predecessors and existing facilities are not necessarily equipped to accomodate such heavy vehicles.

In order to accomodate the heavier test vehicles it is often necessary to reinforce the support structure to upgrade its load capability. Additionally, it may be necessary to replace the arresting engine or to add a second engine. However, these solutions are generally expensive due to high procurement costs and additional maintenance required. Less costly methods of test vehicle arrestment are desirable, which utilize the existing structure and engine, but with some means for improving the mechanical advantage of the latter.

SUMMARY OF THE INVENTION

Accordingly, one object of this invention is to arrest a test ballistic missile launched from a test launcher.

A further object of this invention is to enable existing missile test facilities to accomodate much heavier missiles without concomitant modifications to the associated support structure.

A still further object of the invention is to enable existing missile test facilities to arrest heavier missiles without the need for additional arresting engines.

The above and other objects are realized in a test missile arresting and recovering system which includes a long loop of cable suspended from sheaves on the existing support structure for supporting the test vehicle. The ends of the cable loop are terminated on a singletree device. One end is swivelably connected to the singletree, and the other end is slidably engaged with the singletree and has a terminating cap to prevent it from withdrawing from the singletree.

The singletree is also connected to an arresting engine by a single cable. A releasable grasping mechanism is located near the end of the stroke of the singletree. As the arresting engine takes in cable during a test launch, it also accelerates the singletree toward the grasping mechanism.

When the test vehicle reaches the apogee of its flight, the singletree is at maximum travel and the grasping mechanism captures the terminating cap on the one end of the cable loop. Singletree travel would begin to reverse an instant before the test missile reaches apogee. At that time an intermittent pulling machine located on the support structure grips the captured side of the cable loop and anchors it. The pulling machine and arresting engine then each support one-half of the test missile weight as it is arrested.

Recovery of the test vehicle is accomplished by first raising the vehicle slightly with the pulling machine, releasing the terminating cap from the grasping mechanism and then lowering the missile to its initial position with the pulling machine.

Other advantages and novel features of the invention will become apparent from the detailed description of the invention which follows the drawings wherein:

BRIEF DESCRIPTION OF THE DRAWINGS

FIGS. 6A to 6G schematically illustrate the operative steps involved in using the invention.

DESCRIPTION OF THE PREFERRED EMBODIMENT

Figure 1:
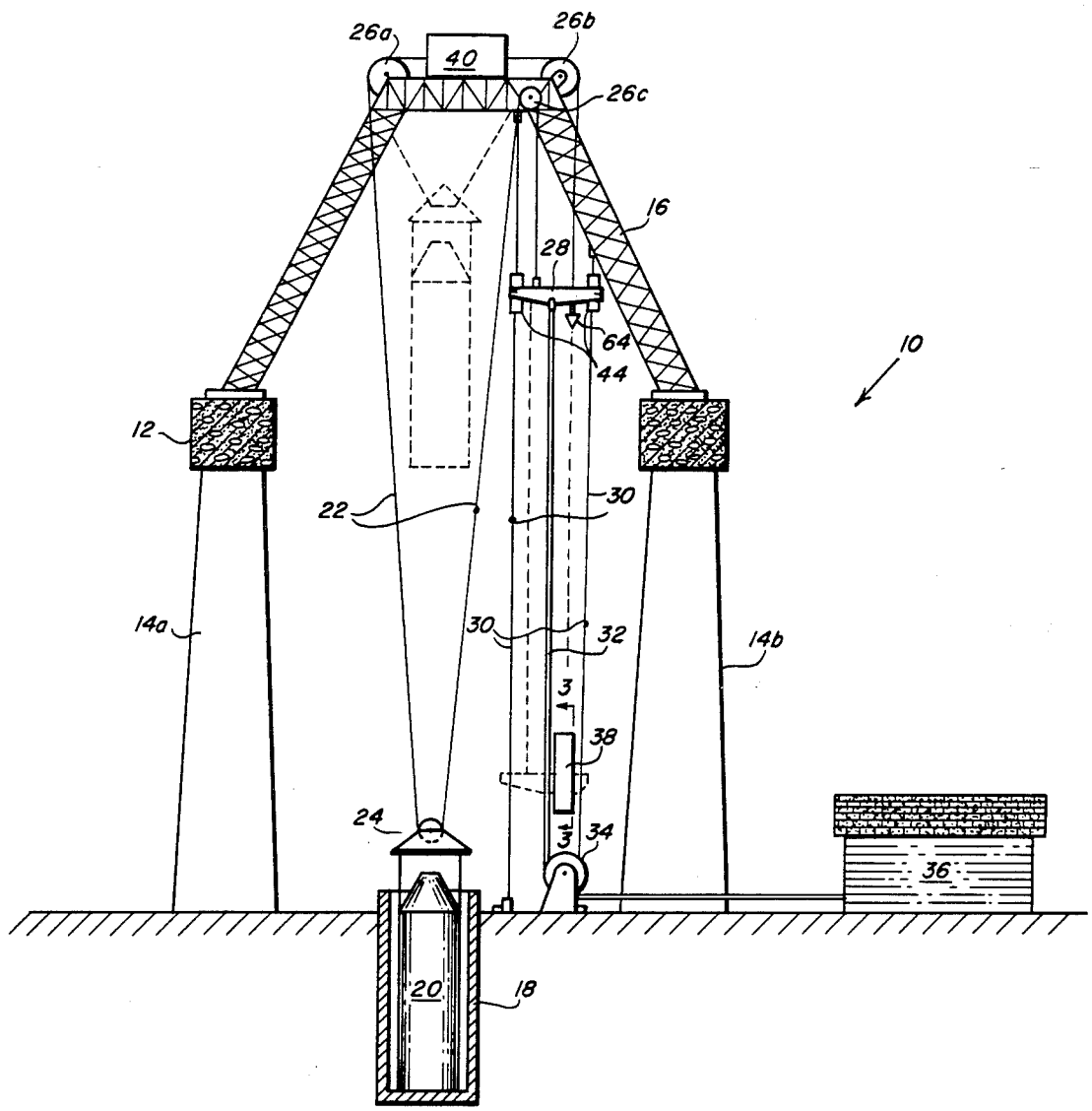
FIG. 1 illustrates an embodiment of a ballistic missile arresting and recovery system according to the invention.

Referring now to the drawings wherein like reference numerals designate identical or corresponding parts among the several views, and more particularly to FIG. 1, there is shown generally a preferred embodiment of a missile arresting and recovery system 10 according to the invention. The system 10 includes a support structure 12 which consists of a pair of concrete columns 14a, 14b and an A-frame lattice superstructure 16. The support structure 12 is constructed over a catapult or test launch tube 18, installed on the ground.

The launch tube 18 is equipped for test launching a missile 20. Accordingly, support structure 12 is constructed to sufficient height that the top of the A-frame lattice 16 is higher than the apogee of a missile 20 launched from launch tube 18.

A sheave assembly 24 is connected to the nose-end of missile 20. A long loop of cable 22 is looped through sheave assembly 24 and over support sheaves 26a, 26b and 26c which are mounted atop the A-frame lattice 16. Cable loop 22 is then terminated on a singletree 28. As can be seen in FIG. 1, one end of cable loop 22 passes through singletree 28 and is terminated with a T-shaped end cap 64.

Singletree 28 is equipped with roller guides 44 which allow it to travel along guide cables 30. A single arresting cable 32 is connected from the singletree 28, through a sheave 34 to an arresting engine 36. The arresting engine 36 may be any of the conventional types capable of taking up and paying out cable at relatively high speed.

After launch, missile 20 will reach its apogee and be arrested shortly thereafter. During that time, arresting engine 36 reels in cable 32 and singletree 28 is drawn downward. A ratchet mechanism 38 is disposed in the path of the singletree 28 such that the T-shaped end cap 64 will engage with mechansim 38. The details of this mechanism will be discussed later on.

Figure 2A:
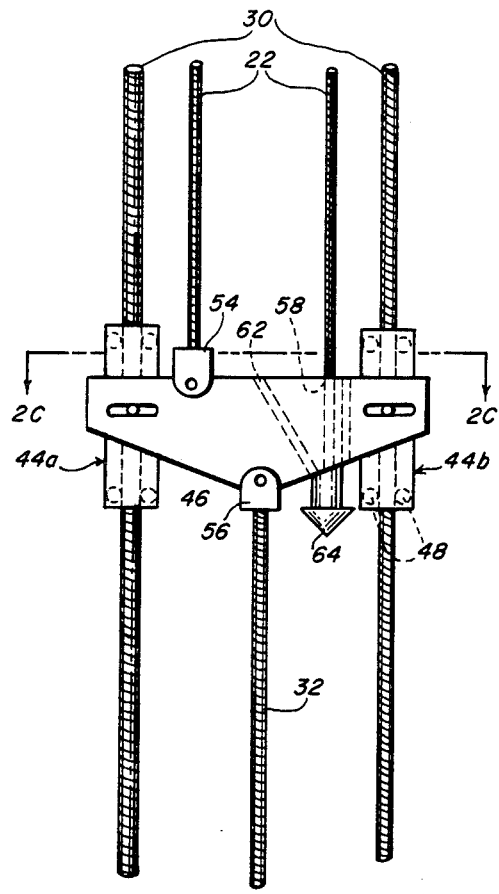
FIGS. 2A, 2B, and 2C illustrate the construction features of a singletree device used in the embodiment shown in FIG. 1.
Figure 2B:
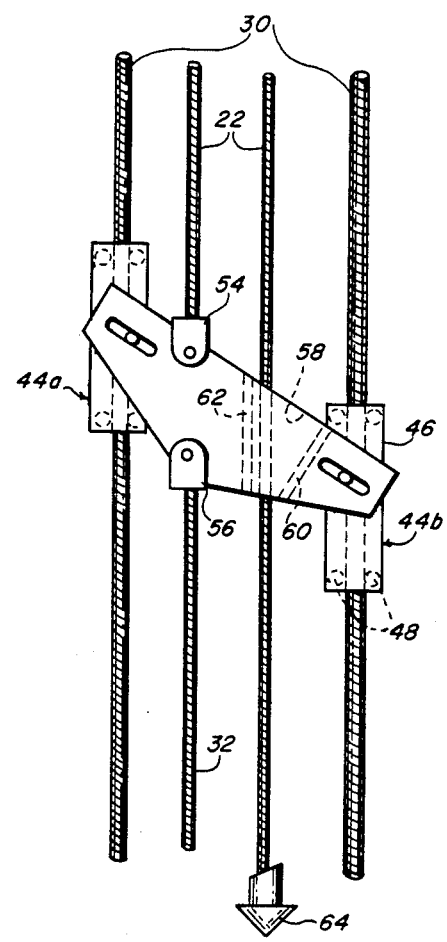
Figure 2C:
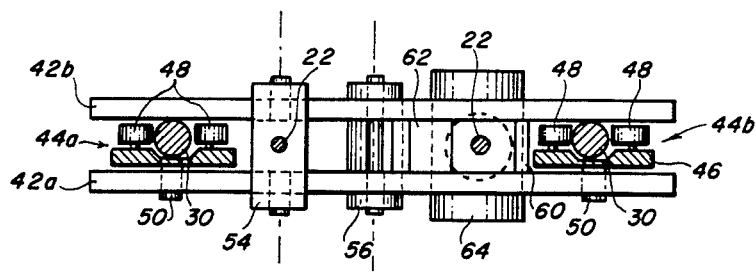

Referring now to FIGS. 2A, 2B and 2C, singletree 28 is shown in greater detail. The singletree 28 is constructed of two heavy metal plates 42a, 42b which are parallelly spaced a short distance apart as shown in FIG. 2C. Roller guides 44a, 44b are disposed at either end of singletree 28.

The roller guides 44a, 44b may be constructed from short pieces of U-channeled metal 46 and roller wheels 48 mounted on the ends of channel pieces 46 to rollably engage with guide cables 30. The roller guides 44a, 44b slide along the guide cables 30 in order to restrict the lateral movement of singletree 28 during operation of the invention. The roller guides 44a, 44b are swivelably attached to plate 42b by means of pins 50. Slots 47 are machined into plate 42a as shown in FIG. 2B for receiving the pins 50. In this manner the singletree 28 may pivot when there is no load on the singletree 28 due to the capped end of cable loop 22.

An angled chamber 58 is provided between plates 42a and 42b to allow for the degree of pivoting which will occur. Angled chamber 58 is formed by inserting a first wall piece 60 and a second wall piece 62 between plates 42a and 42b in the vicinity where the end of cable loop 22 passes through the singletree 28. The other end of cable loop 22 is swivelably affixed to singletree 28 by means of a clevis 54. The angle subtended by the wall pieces 60 and 62 corresponds to an orientation of singletree 28 where cables 22 and 32 are axially aligned, as in FIG. 2B. The rationale for this configuration will be explained later.

Figure 3C:
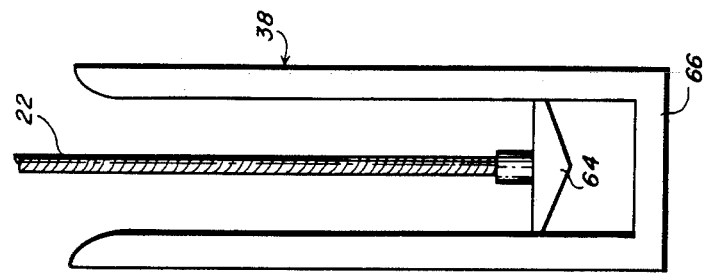
FIGS. 3A, 3B, and 3C illustrate the construction features of a ratchet mechanism used in the embodiment shown in FIG. 1.
Figure 3B:
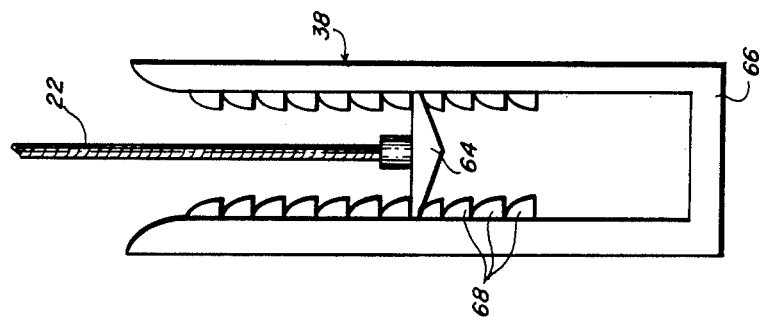
Figure 3A:
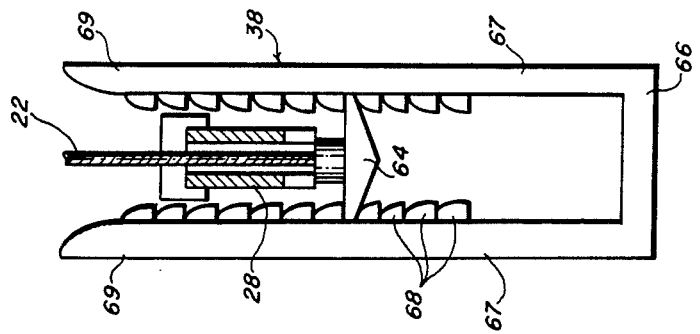

Referring now to FIGS. 3A, 3B and 3C there is shown a ratchet mechanism 38 used to straddle the singletree 28 and capture the T-shaped cable end cap 64. The ratchet mechanism 38 of the preferred embodiment has a U-shaped housing 66. Vertical walls 67 of housing 66 are spaced apart sufficiently to allow singletree 28 and T-shaped end cap 64 to pass therebetween. The tops 69 of walls 57 are tapered in order to facilitate passage of the singletree 28.

A plurality of spring loaded ratchet teeth 68 are disposed along the insides of walls 67. The teeth 68 are formed such that as end cap 64 slides over the contoured portions, the teeth will retract into walls 67, but will spring back thereby preventing the end cap 64 from traveling in the opposite direction. In this manner end cap 64 is captured and held. However, ratchet mechanism 38 need not be designed to support any load.

Ratchet mechanism 38 is also constructed such that the ratchet teeth 68 may be manually retracted and locked so that the end cap 64 may be withdrawn as shown in FIG. 3C. The purpose for this feature will be discussed later in the application.

Figure 4A:
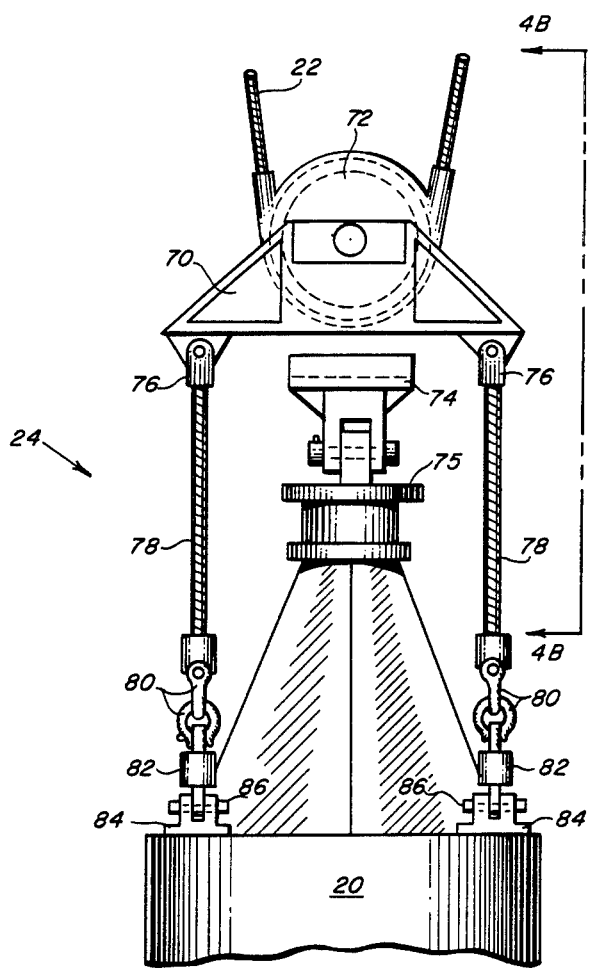
FIGS. 4A and 4B illustrate the construction features of a nose sheave used in the embodiment shown in FIG. 1.
Figure 4B:
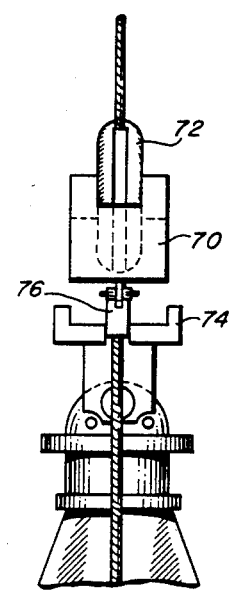

Referring now to FIGS. 4A and 4B, there is shown generally an embodiment of the sheave assembly 24 which constitutes a part of the invention. The sheave assembly 24 is designed to support a substantially heavy load, and includes a spreader 70 to which a sheave 72 is mounted such that cable loop 22 may be looped therethrough. Clevises 76 couple support cables 78 to the spreader 70. A system of shackles 80 and load cells 82 are attached to the other end of the support cables 78. The load cells 82 are attached to clevis eyes 84, and thus to the test missile 20, by means of bolts or pins 86.

Sheave assembly 24 provides a flexible means for supporting test missile 20 from the cable loop 22. A special support member 7 is mounted atop the nose 75 of test missile 20 such that it will engage and support the spreader 70 when slack develops in cable loop 22 causing cables 78 to slacken also.

Referring now to FIGS. 5A through 5D there is shown an embodiment of an intermittent pulling machine 40 for supporting, raising, and lowering the test missile 20 after arrestment. The intermittent pulling machine 40 has a housing 88 adapted to be fixedly mounted atop A-frame lattice 16.

Figure 5A:
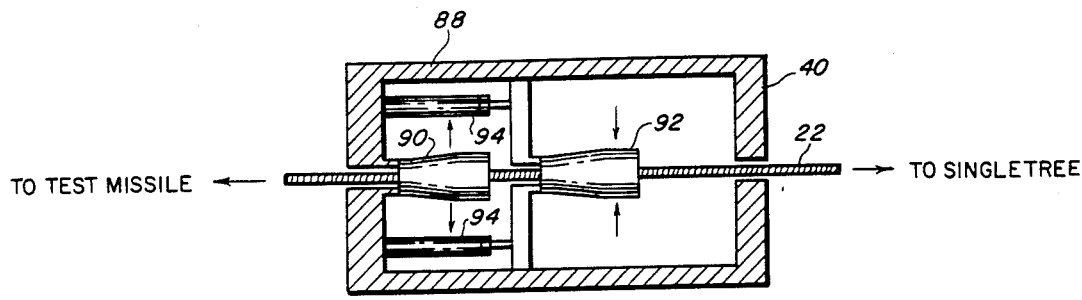
FIGS. 5A to 5D show the operative features of an intermittent pulling machine used in the embodiment shown in FIG. 1.

FIG. 5A shows the pulling machine 40 in a starting position for either raising or lowering. For illustrative purposes a pulling or raising action will be described; it being understood that the lowering operation would be the reverse of the steps to be described.

Figure 5B:
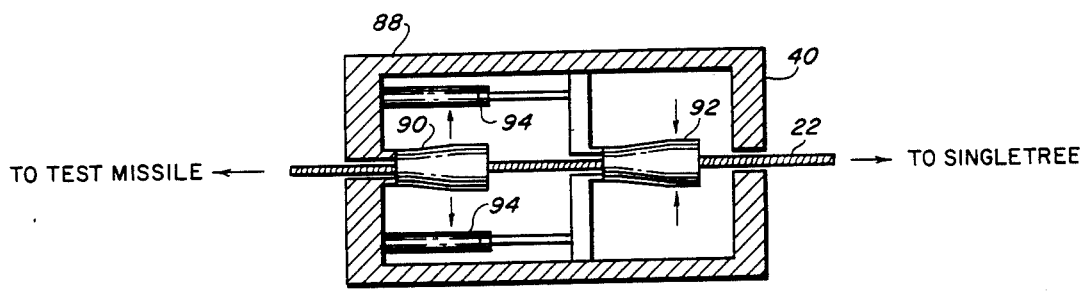
Figure 5C:
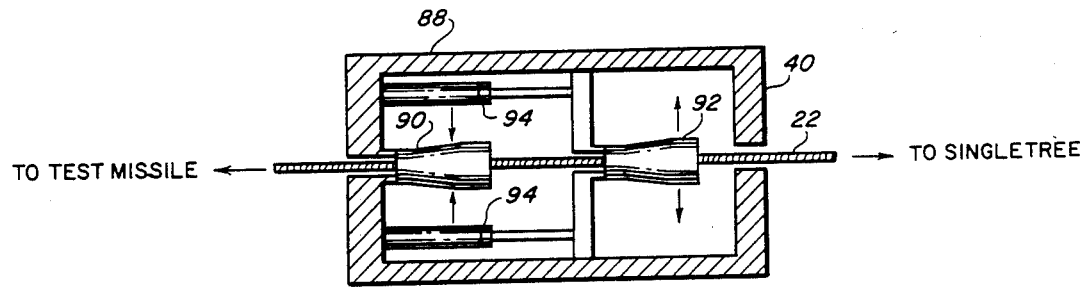

Initially, and as shown in FIG. 5A stationary gripper 90 is open as indicated by the arrows so that cable loop 22 may slide therethrough. A moving gripper 92 is closed, also indicated by arrows, and firmly holds cable loop 22. Hydraulic rams or jacks 94 are activated to displace moving gripper 92 as shown in FIG. 5B. When the limit of this pulling stroke has been reached, stationary gripper 90 closes, firmly grasping cable loop 22 and moving gripper 92 opens as shown in FIG. 5C.

Figure 5D:
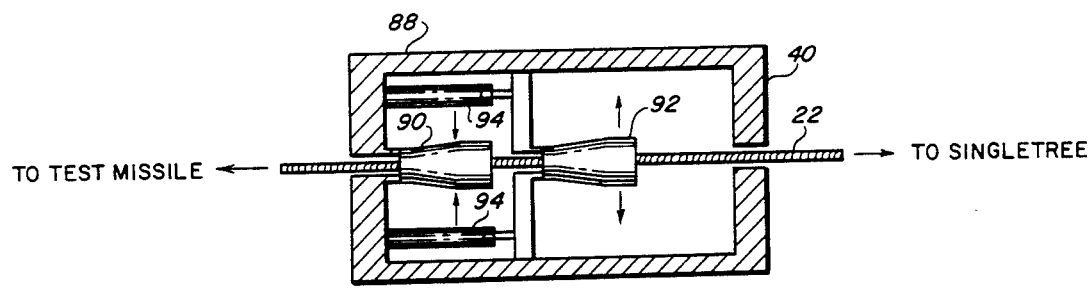

The hydraulic rams 94 are then released, or driven in the opposite direction, and moving gripper 92 is thereby returned to the starting position as shown in FIG. 5D for the next pull. In this manner, the cable loop 22 may be incrementally pulled in one direction or paid-out in the other direction. It can be readily seen that cable loop 22 will not slide due to the weight of test missile 20, since it is always firmly held by either stationary gripper 90 or moving gripper 92. It is to be understood that the intermittent cable puller 40 is designed to support at least one half of the weight of test missile 20.

Referring now to FIGS. 6A through 6G, there are shown diagramatically the various operative steps in using the invention. Initially, as shown in FIG. 6A, the test missile 20, cable loop 22, and singletree 28 are in a stationary position, the physical arrangement of which would appear like FIG. 1.

In FIG. 6B the test missile 20 is launched. Arresting engine 36 begins reeling in arresting cable 32, thereby accelerating singletree 28 toward ratchet mechanism 38. Throughout this time interval the gripper 90 and 92 of pulling machine 40 are open, in order to let cable loop 22 slide easily therethrough.

As the test missile 20 reaches its apogee, as shown in FIG. 6C, the singletree would draw the T-shaped end cap 64 into ratchet mechanism 38. The teeth 68 of mechanism 38 grip the T-shaped end cap 64 and hold it.

Simultaneously, and as shown in FIG. 6D, arresting engine 36 would reverse direction, paying out cable 32 and one or both of the grippers 90,92 of pulling machine 40 would close, anchoring one side of cable loop 22. At this point singletree 28 would pivot since the load is removed from one end causing the arresting cable 32 and the other end of cable loop 22 to align. The pulling machine 40 and A-frame 16 would then support one half of the weight of test missile 20, while arresting engine 36 would support the other half. Test missile 20 would then begin to fall and arresting engine 36 would reel out cable 32 at twice normal speed until singletree 28 is returned to the top of its stroke, thereby arresting test missile 20, as shown in FIG. 6E. Descent of the test missile 20 would normally stop at or above one half of the apogee height.

Recovery of the test missile is accomplished by first raising the missile 20 with pulling machine 40, thereby freeing the T-shaped end cap 64 from the teeth 68 of ratchet mechanism 38 as shown in FIG. 6F. When end cap 64 has cleared the ratchet mechanism 38, the teeth 68 are retracted and locked. When this is accomplished as shown in FIG. 6G, the test missile 20 is lowered to its initial position with the pulling machine 40 where it may be examined or reused.

Some of the many advantages and features of the present invention should now be apparent in view of the above teachings. For example, a system has been described for arresting and recovering test ballistic missiles launched from a catapult or launching tube. Moreover, the invention is easily adapted to existing arrest and recovery facilities. Adoption of the disclosed system will enable heavy payloads to be arrested and recovered without the need for additional support structure or arresting engines.

Numerous modifications and variations of the subject invention are possible in light of the above teachings. It is therefore to be understood that within the scope of the appended claims the invention may be practiced otherwise than as specifically described.

What is claimed is:

1. A system for arresting and recovering a test ballistic missile launched from a surface launcher to a predetermined height, said system comprising:
    a support structure disposed over the launcher and formed to stand higher than the launch height;
    a loop of cable formed to be operatively suspended from said support structure and adapted to be coupled to the test missile;
    a singletree formed for spreading and terminating the ends of said cable loop such that one end is swivelably connected to said singletree and the other end is slidably engaged therewith;
    means for capping the slidable end of said cable loop such that the cable end may not be withdrawn from said singletree;
    arresting means operatively connected to said singletree for taking up slack developed in said cable loop as the test missile is launched and for arresting the test missile after it has reached its apogee;
    means for releasably capturing said capping means at the limit of travel of said singletree; and
    means for lowering the test missile after it has been arrested, whereby the missile may be recovered.

2. A missile arresting and recovery system as recited in claim 1 wherein said releasable capturing means comprises:
    a ratchet mechanism formed to grasp and hold said capping means when said singletree has reached the limit of its travel and to release said capping means when the test missile is being lowered after arrestment.

3. A missile arresting and recovery system as recited in claim 2 wherein said missile lowering means comprises:
    an intermittent pulling machine formed to receive and pull said cable loop.

4. A missile arresting and recovery system as recited in claim 3 further comprising:
    sheave means formed to be encircled by said cable loop and adapted to be affixed to the test missile for coupling said cable loop to the missile.

5. A missile arresting and recovery system as recited in claim 4 wherein said arresting means comprises:
    an arresting engine formed to reel up and pay out cable at high speed; and
    an arresting cable connected to said singletree and adapted to be reeled up by said arresting engine, whereby the slack developed in said cable loop as the missile is launched may be taken up.

6. An improved system for arresting and recovering a test ballistic missile launched from a surface launcher to a predetermined height, of the type having a support structure disposed over the launcher and formed to stand higher than the launch height, and an arresting engine disposed adjacent to the support structure and formed for reeling in and paying out cable at high speed, wherein the improvement comprises:
    a loop of cable formed to be operatively suspended from said support structure and adapted to be coupled to the test missile;
    a singletree formed to spread and terminate the ends of said cable loop such that one end is swivelably connected to said singletree and the other end is slidably engaged therewith;
    means for capping the slidable end of said cable loop such that the cable end may not be withdrawn from said singletree;
    an arresting cable formed to be connected between said singletree and the arresting engine such that as said arresting cable is reeled-in said singletree and said cable loop will be drawn to take up slack developed by the ascent of the test missile;
    means for releasably capturing said capping means at the limit of travel of said singletree; and
    means for lowering the test missile after it has been arrested, whereby it may be recovered.

7. The missile arresting and recovery system of claim 6 wherein said releasable capturing means comprises:
    a ratchet mechanism formed to grasp and hold said capping means when said singletree has reached the limit of its travel and to release said capping means when the test missile is being lowered after arrestment.

8. The missile arresting and recovery system of claim 7 wherein said missile lowering means comprises:
    an intermittent pulling machine formed to receive and pull said cable loop.

9. The missile arresting and recovery system of claim 8 further comprising:
    sheave means formed to be encircled by said cable loop and adapted to be affixed to the test missile for coupling said cable loop to the missile.

* * * * *